(12) United States Patent
Lengsfield, III et al.

(10) Patent No.: US 7,894,159 B2
(45) Date of Patent: Feb. 22, 2011

(54) PERPENDICULAR WRITE HEAD WITH INDEPENDENT TRAILING SHIELD DESIGNS

(75) Inventors: Byron Hassberg Lengsfield, III, Gilroy, CA (US); James Terrence Olson, Santa Cruz, CA (US); Thomas Dudley Boone, Jr., San Jose, CA (US); Petrus Antonius Van Der Heijden, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 685 days.

(21) Appl. No.: 11/737,707

(22) Filed: Apr. 19, 2007

(65) Prior Publication Data

US 2008/0259498 A1    Oct. 23, 2008

(51) Int. Cl.
G11B 5/127    (2006.01)
(52) U.S. Cl. .............................. 360/125.03
(58) Field of Classification Search ........... 360/125.03, 360/123.58, 123.37, 123.12
See application file for complete search history.

(56) References Cited

U.S. PATENT DOCUMENTS

| | | | |
|---|---|---|---|
| 5,075,956 A | 12/1991 | Das | 29/603 |
| RE33,949 E | 6/1992 | Mallary et al. | 360/110 |
| 6,513,228 B1 | 2/2003 | Khizroev et al. | 29/603.14 |
| 6,954,340 B2 | 10/2005 | Shukh et al. | 360/317 |
| 7,002,775 B2 | 2/2006 | Hsu et al. | 360/125 |
| 7,009,812 B2 | 3/2006 | Hsu et al. | 360/126 |
| 7,031,121 B2 | 4/2006 | Khera et al. | 360/317 |
| 7,042,682 B2 | 5/2006 | Hu et al. | 360/317 |
| 7,070,698 B2 | 7/2006 | Le | 216/22 |
| 7,075,756 B1 | 7/2006 | Mallary et al. | 360/317 |
| 7,551,396 B2 * | 6/2009 | Hsu et al. | 360/125.3 |
| 7,558,019 B2 * | 7/2009 | Le et al. | 360/125.06 |
| 7,649,712 B2 * | 1/2010 | Le et al. | 360/125.3 |
| 2005/0024771 A1 | 2/2005 | Le | 360/126 |
| 2005/0057852 A1 | 3/2005 | Yazawa et al. | 360/125 |
| 2005/0128637 A1 | 6/2005 | Johnston et al. | 360/125 |
| 2005/0141137 A1 | 6/2005 | Okada et al. | 360/122 |
| 2005/0237665 A1 | 10/2005 | Guan et al. | 360/125 |

(Continued)

FOREIGN PATENT DOCUMENTS

JP    2004127480    4/2004

OTHER PUBLICATIONS

Kanai et al., "Numerical analysis of narrow-track single-pole-type head with slide shields for 1 Tb/in.$^2$" Journal of Applied Physics vol. 96, No. 10 May 15, 2003.

(Continued)

*Primary Examiner*—Julie Anne Watko
(74) *Attorney, Agent, or Firm*—Zilka-Kotab, PC

(57) ABSTRACT

A magnetic write head having independent trailing and side magnetic shields. The side shields and trailing shields are independently of one another so that they can have throat heights that are different from one another. This advantageously allows the magnetic potential between the write pole and side shields to be controlled independently of one another without relying on the side gap and trailing gap thicknesses. Furthermore, magnetic performance of the write head can be improved because the side shields can be constructed with varying tapered throat heights, while the throat height of the trailing shield can remain constant.

6 Claims, 15 Drawing Sheets

U.S. PATENT DOCUMENTS

2005/0280935 A1   12/2005   Clinton et al. .............. 360/125
2006/0082924 A1   4/2006    Etoh et al. ................. 360/125
2006/0098334 A1   5/2006    Jayasekara et al. .......... 360/125
2008/0278861 A1*  11/2008   Jiang et al. ................ 360/319

OTHER PUBLICATIONS

Yamakawa et al,, "Single-pole recording head design for 100 Gbpsi perpendicular magnetic recording" Journal of Magnetism and Magnetic Materials 235 (2001) 354-361.

Kanai et al., "A Single-Pole-Type Head Design for 400 (lb/ in.$^2$ Recording" IEEE Transactions on Magnetics, vol. 41, No. 2, Feb. 2005.

Kanai et al., "Recording Field Analysis of Narrow-Track SPT Head With Side Shields, tapered Main Pole, and tapered Return Path for 1 Tb/in.$^2$" IEEE Transactions on Magnetics, vol. 39, No. 4, Jul. 2003.

Mallary et al., "One Terabit per Square Inch Perpendicular Recording Conceptual Design" IEEE Transactions on Magnetics, vol. 38, No. 4, Jul. 2002.

* cited by examiner

PERPENDICULAR WRITE HEAD WITH INDEPENDENT TRAILING SHIELD DESIGNS

FIELD OF THE INVENTION

The present invention relates to perpendicular magnetic recording and more particularly to a write head having a separately configured trailing and side shields.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, referred to as a spacer layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an anti-ferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current, is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction substantially perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

In order to increase field gradient and decrease side writing, some perpendicular recording systems have been configured with wrap around trailing shields. Such magnetic shields are formed as a single magnetic structure that wraps around the trailing edge and sides of the write pole. Because such wrap around trailing shields are constructed as a single magnetic layer, they have a single throat height (distance at the between the air bearing surface and the back edge) for both the trailing and side portions of the shield. The primary way to control the magnetic potential between the write pole and the trailing shield or between the write pole and the side shields is to adjust the gap between the write pole and the trailing shield, or the gap between the write pole and the side shields. This severely constrains the system design in terms of optimization.

As areal density increases, larger demands are put on the write-head to be able to generate smaller tracks and larger field gradients. One typically tries to scale the dimensions of the head according to the areal density gain, but this is often problematic because the dimensions may be too small to manufacture with acceptable yield, or perhaps because another part of the recording system does not scale, such as the spacing between the head and the disk, or the grain size in the media, etc. In order to increase track density, for example, one usually has to make the write pole narrower. This causes a reduction in magnetic field and field gradient which must be compensated for in some way by the recording system.

As perpendicular write heads become ever smaller, it becomes necessary to find ways to construct write heads having structures such as trailing and side shields wherein the important parameters such as magnetic potential can be carefully and independently controlled. Such structures should be capable of being manufactured without significant additional cost or complexity using currently available photolithographic processes.

SUMMARY OF THE INVENTION

The present invention provides a magnetic write head having side shields and a trailing shield, wherein the trailing shield is disconnected from the side shields. The trailing and side shields are constructed independently of one another allowing them to have different throat heights.

By independently controlling the throat heights of the trailing and side shields, the magnetic potential between the write pole and side shields, can be controlled independently of the magnetic potential between the trailing shield and the write pole.

The trailing shield can be magnetically connected with the side shields, by studs that can also be connected with a magnetic pedestal that is connected with a return pole. The magnetic studs can also be connected directly with a return pole such as a trailing return pole.

In addition, by constructing the pole and shields as independent structures, the side shields can be configured with a tapered, varying throat height while the trailing shield is configured with a throat height that is substantially constant.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
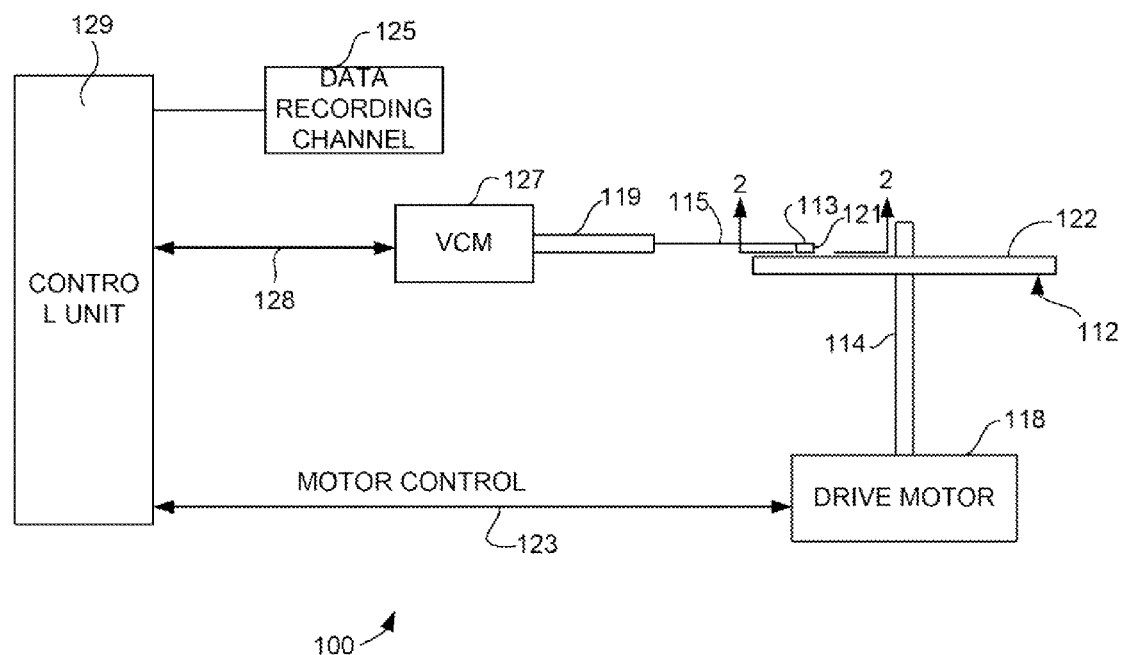
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic, field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
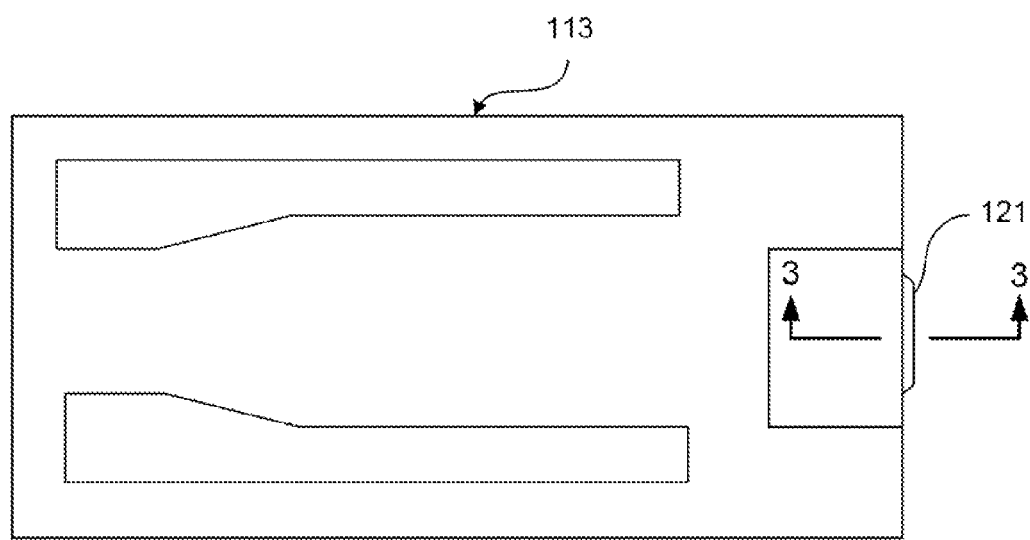
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
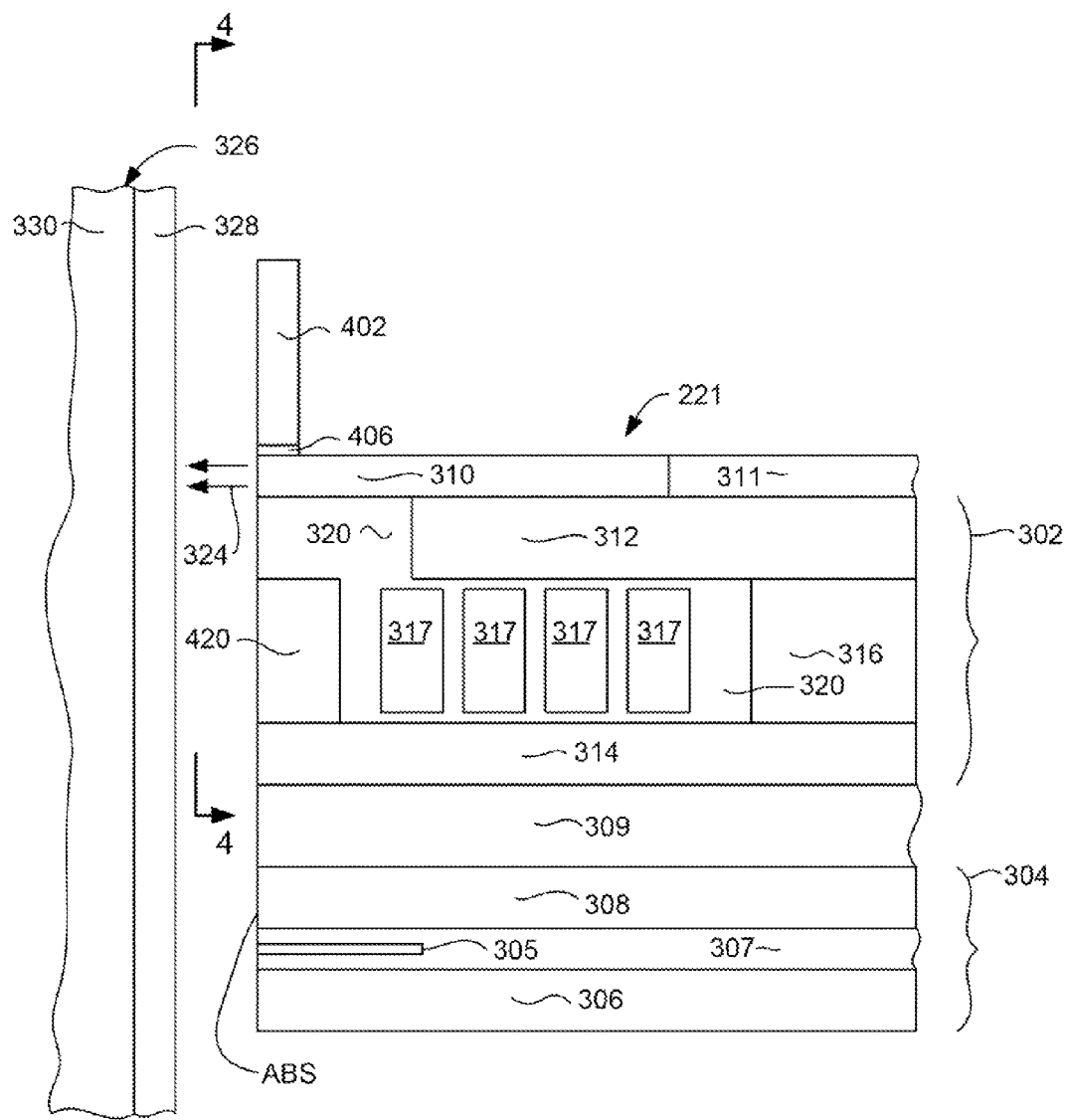
FIG. 3 is a cross sectional view, taken from line 3-3 of FIG. 2 and rotated 90 degrees counterclockwise, of a magnetic head according to an embodiment of the present invention.

With reference now to FIG. 3, a magnetic head 221 for use in a perpendicular magnetic recording system is described. The head 221 includes a write element 302 and a read element 304. The read element includes a magnetoresistive sensor 305, such as a current in plane giant magnetoresistive (CIP GMR) sensor. However, the sensor 305 could be another type of sensor such as a current perpendicular to plane (CPP) GMR sensor or, a tunnel junction sensor (TMR) or some other type of sensor. The sensor 305 is located between and insulated from first and second magnetic shields 306, 308 and embedded in a dielectric material 307. The magnetic shields 306, 308, which can be constructed offer example CoFe or NiFe, absorb magnetic fields such as those from up-track or down track data signals, ensuring that the read sensor 305 only detects the desired data track located between the shields 306, 308. A non-magnetic, electrically insulating gap layer 309 may be provided between the shield 308 and the write head 302.

Figure 4:
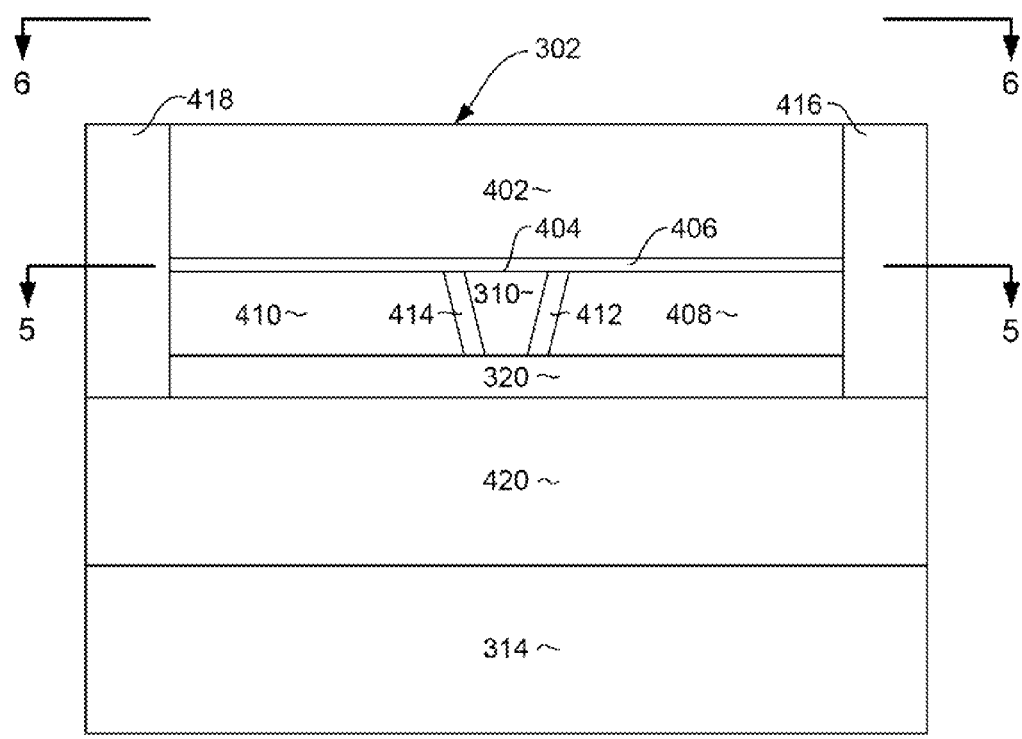
FIG. 4 is an ABS view a write head according to an embodiment of the invention.

With continued reference to FIG. 3, the write element 302 includes a write pole 310 that is magnetically connected with a magnetic shaping layer 312, and is embedded within an insulation material 311. The write pole 310 has a small cross section at the air bearing surface (as seen in FIG. 4) and is constructed of a material having a high saturation moment, such as NiFe or CoFe. More preferably, the write pole 310 is constructed as a lamination of layers of magnetic material separated by thin layers of non-magnetic material. The write element 302 also has a return pole 314 that preferably has a surface exposed at the ABS and has a cross section parallel with the ABS surface that is much larger than that of the write pole 310. The return pole 314 is magnetically connected with the shaping layer 312 by a back gap portion 316. The shaping layer 312, return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. The write coil 317 is surrounded by an electrically insulating material 320 that electrically insulates the turns of the coil 317 from one another and electrically isolates the coil 317 from the surrounding magnetic structures 310, 312, 316, 314. The insulation layers 320 can be constructed of a material such as alumina ($Al_2O_3$) or can be constructed as various layers of the same or different electrically insulating, non-magnetic materials. The coil 317 can be a pancake coil that wraps around the back gap 316, or could be a helical coil having an additional set of turns (not shown) that extend over the write pole 310 and shaping layer 312.

When a current passes through the coil 317, the resulting magnetic field causes a magnetic flux to flow through the return pole 314, back gap 316, shaping layer 312 and write pole 310. This magnetic flux causes a magnetic write field 324 to be emitted toward an adjacent magnetic medium 326. The magnetic medium 326 includes a thin, magnetically hard top layer 328 and a magnetically soft under-layer 330. The write field 324 locally magnetizes the magnetically hard top layer and then travels through the magnetically soft under layer to return to the return pole 314, thereby completing a magnetic circuit.

With reference to FIG. 4, a trailing shield 402 is formed adjacent to the trailing edge 404 of the write pole 310. The trailing shield 402 is constructed of a magnetic material such as NiFe and is separated from the write pole 310 by a non-magnetic trailing gap 406. The write head 302 also includes first and second side shields 408, 410, formed adjacent to the sides of the write pole 310 and which are separated from the sides of the write pole 310 by first and second non-magnetic side gaps 412, 414. The side gaps 412, 414 can be constructed of a material that is either the same as or different than the trailing gap 406, and can have a thickness that is different than that of the trailing gap 406.

With continued reference to FIG. 4, first and second magnetic studs 416, 418 connect the trailing shield 402 and side shields 408, 410 with a magnetic pedestal 420. The magnetic pedestal 420 is magnetically connected with the return pole 314. In this way, the studs 416, 418 can magnetically connect the trailing shield 402 and side shields 408, 410 with the return pole 314. This allows the magnetic potentials between the write pole 310 and the trailing shield 402 to be controlled somewhat separately due to the gap 406 decoupling then locally. This independence of the side shields 408, 410 with respect to the trailing shield 402 advantageously allows the magnetic potentials between the write pole 310 and side shields 408, 410 and between the write pole 310 and the trailing shield 402 to be independently controlled, as will be described further below.

Figure 5:
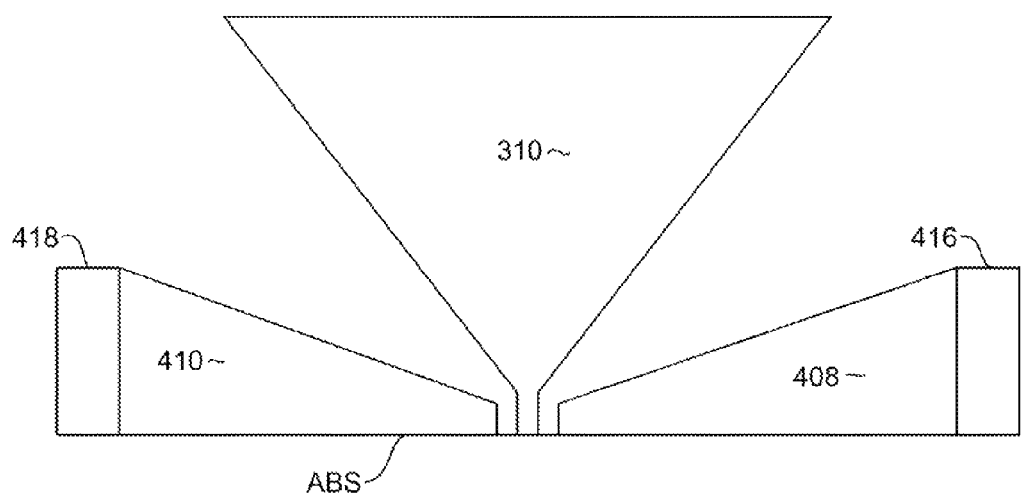
FIG. 5 is a top down sectional view taken from line 5-5 of FIG. 4.
Figure 6:
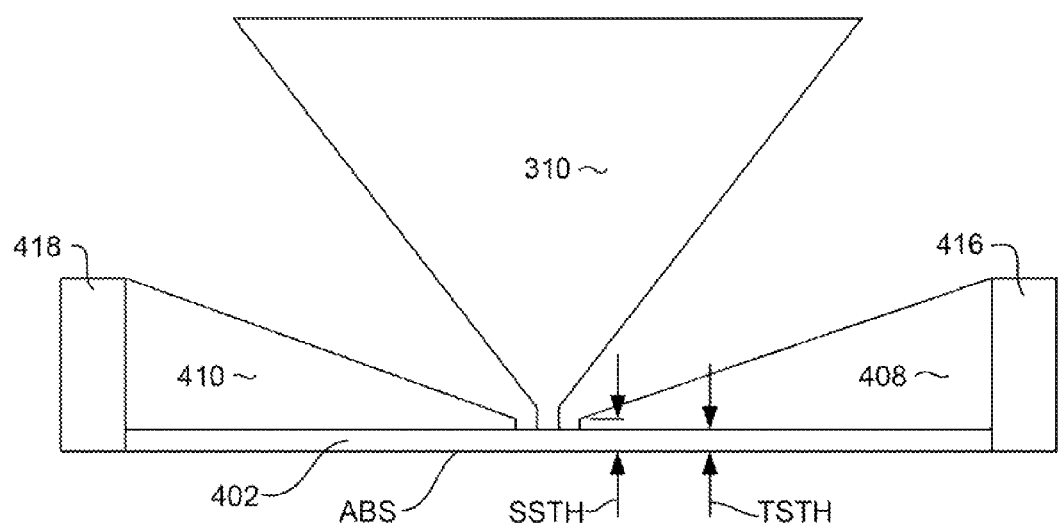
FIG. 6 is a top down view taken from line 6-6 of FIG. 4.

With reference now to FIGS. 5 and 6, top down views of the side shields 408, 410 and the trailing shield 402. FIG. 5, shows a top down view taken from line 5-5 of FIG. 4. As can be seen in FIG. 5, the side shields 408, 410 can be constructed to have a throat height (measured from the ABS) that tapers away from the ABS with increasing distance from the write pole 310. What's more, this taper can initiate at its inner most end rather than having a constant throat height section (such as would be necessary if the trailing shield 402 were formed integrally with the side shields 408, 410).

FIG. 6 shows a top down view taken from line 6-6 of FIG. 4. Therefore, FIG. 6 shows the trailing shield 402 located over the side shields 408, 410. As can be seen, because the side shields 408, 410 are independent of the trailing shield 402, the side shields 408, 410 can each have a throat height that is different from that of the trailing shield 402. This allows the magnetic potential between the write pole 310 and the side shields 408, 410 and the magnetic potential between the write pole 310 and the trailing shield 402 to be controlled independently of one another (through throat height) and independently of the thicknesses of the side and trailing gaps 412, 414, 406 (FIG. 4). For example, in FIG. 6 it can be seen that the trailing shield 402 can have a Trailing Shield Throat Height (TSTH) measured from the ABS to its back edge. The side shield 408 can have a Side Shield Throat Height (SSTH) at its inner end that is different than the Trailing Shield Throat Height (TSTH). What's more, the trailing shield 402 and side shield 408 can have throat heights that vary along independently of one another. For example, as shown in FIG. 6, the throat height TSTH of the trailing shield 402 is constant, while the throat height SSTH of the side shield 408 tapers, becoming larger with increasing distance from the write pole 310 which aids in avoiding magnetic saturation of the side shields 408, 410. This advantageously allows the magnetic properties of the side shields 408, 410 and the trailing shield 402 to be optimized independently based on design requirements.

It should be pointed out that, if the side shields 408, 410 have a sufficiently small throat height, the side gaps thicknesses 412, 414 could actually be reduced to zero so that the side shields 408, 410 actually contact the write pole 310. This is made possible by the fact that the side shields 408, 410 can be have a different throat height than the trailing shield 402. If the side shields 408, 410 are made with a sufficiently small throat height, then portions of the side shields 408, 410 can become magnetically saturated during use, effectively forming a side gap in the inner portion of the side shields 408, 410.

Figure 13:
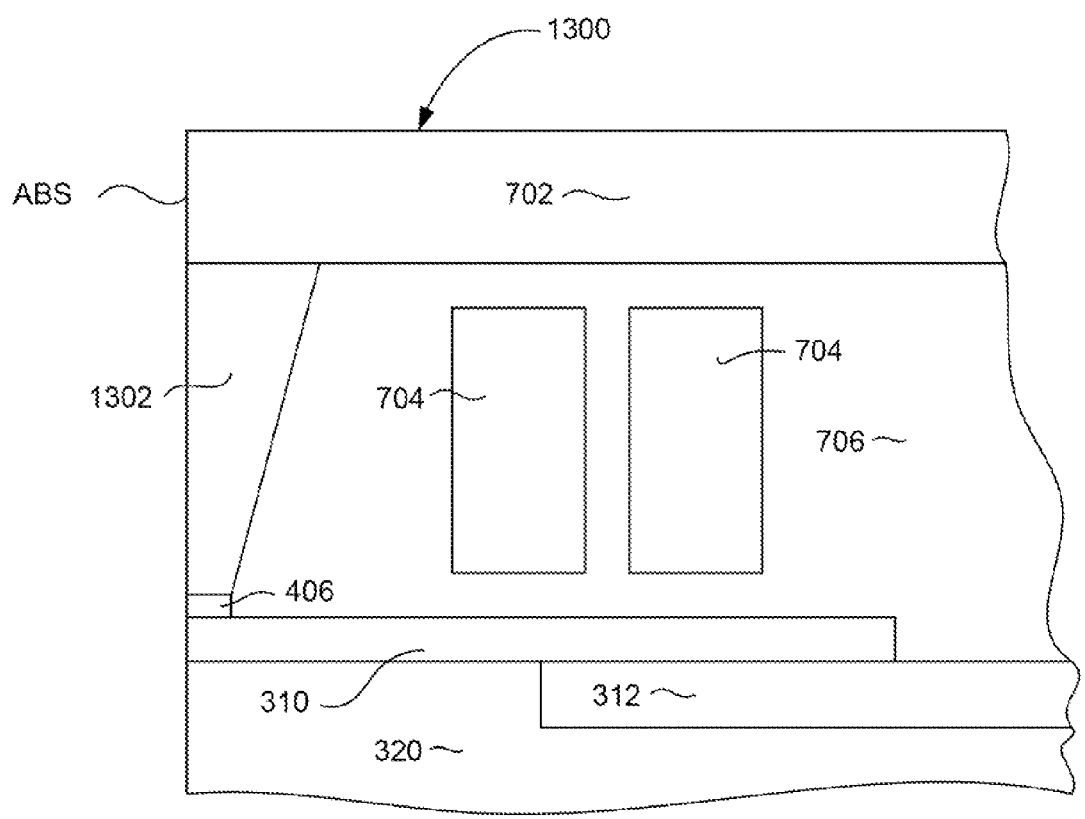
FIG. 13 is a side cross sectional view of a write head according to another embodiment of the invention.

With reference to FIG. 13, which shows a side cross sectional view of a portion of a write head 1300, the write head 1300 could be constructed having a trailing shield 1302 that tapers away from the ABS in the down track direction. For example, the trailing shield 1302 could have a throat height that is smaller at the gap (i.e. its leading edge) and which is larger at its trailing edge. Such a design may or may not include a trailing return pole 702 and upper write coil structure 704.

The drop of magnetostatic potential between the pole 310 and the trailing shield 402 and between the write pole 310 to the side shields 408, 410 determines how much flux leaks to the shields 402, 408, 410 vs. how much field goes through the soft underlayer 330 of the magnetic medium 326 (FIG. 3). A conventional head has a one-piece wrap-around shield such that the primary way to adjust the write pole to trailing shield potential drop and write pole to side shield potential drop is by adjusting the trailing gap and side gap thicknesses. A design according to the present invention allows the trailing shield 402 and side shields 408, 410 to be constructed independently and connected with a magnetic stud 416, 418.

Figure 7:
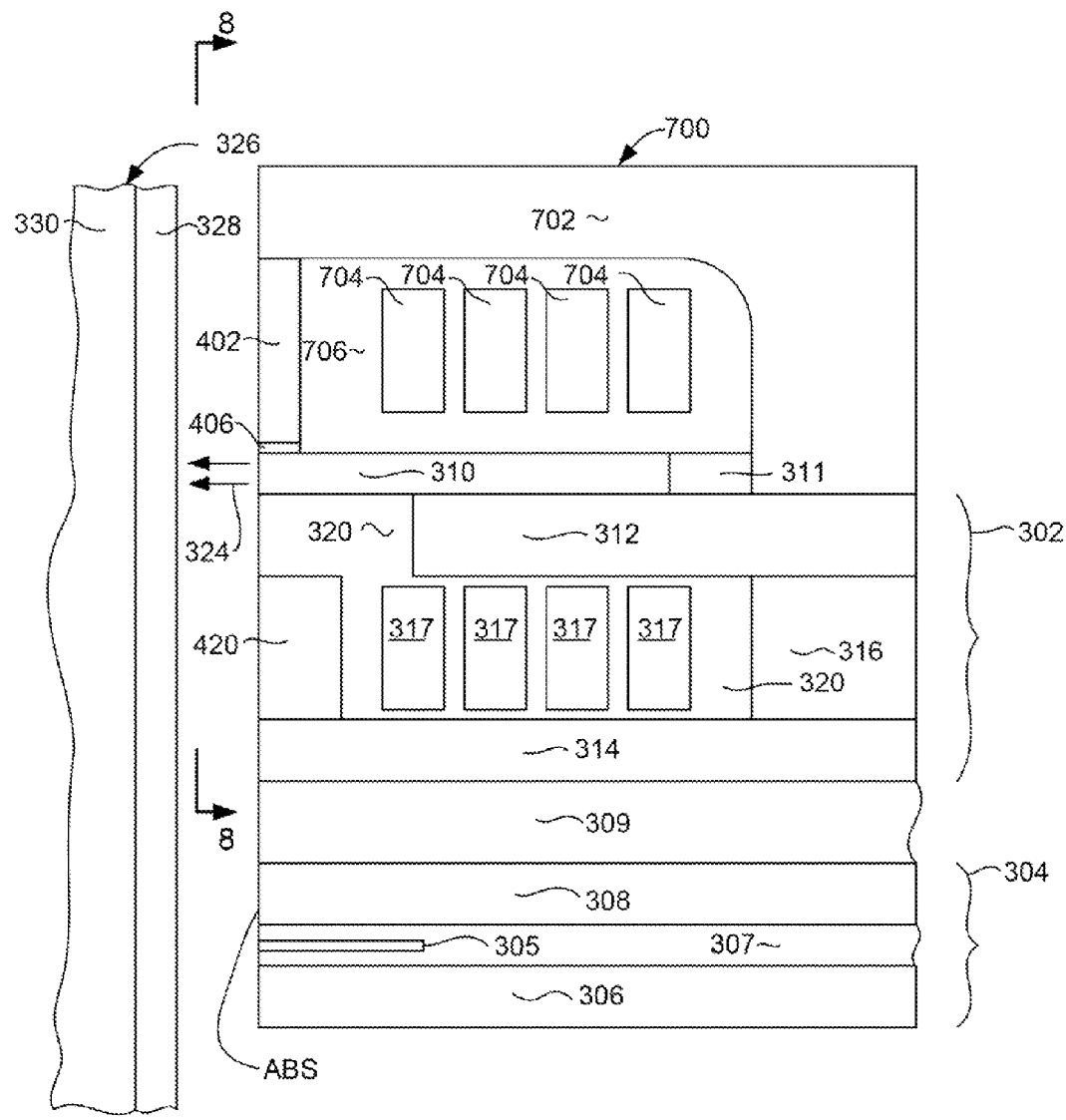
FIG. 7 is a side cross sectional view of a write head according to another embodiment of the invention.

With reference now to FIG. 7, in another embodiment of the invention, a head 700 includes a trailing return pole 702 that can be used to magnetically connect the trailing shield 402 with the rest of the magnetic structures (ie. 310, 312, 316, 314) in a region away from the ABS. A second set of coil turns 704 can be included above the write pole 310 and shaping layer 312, and can be part of a helical coil structure that uses both the upper and lower coil turns 317, 704 or can be turns of a pancake coil that is separate from the lower coil 317. The upper coil turns 704 can be embedded in a coil insulation layer 706, that can be a non-magnetic, electrically insulating material such as hard baked photoresist, Alumina or a combination of these materials.

Figure 8:
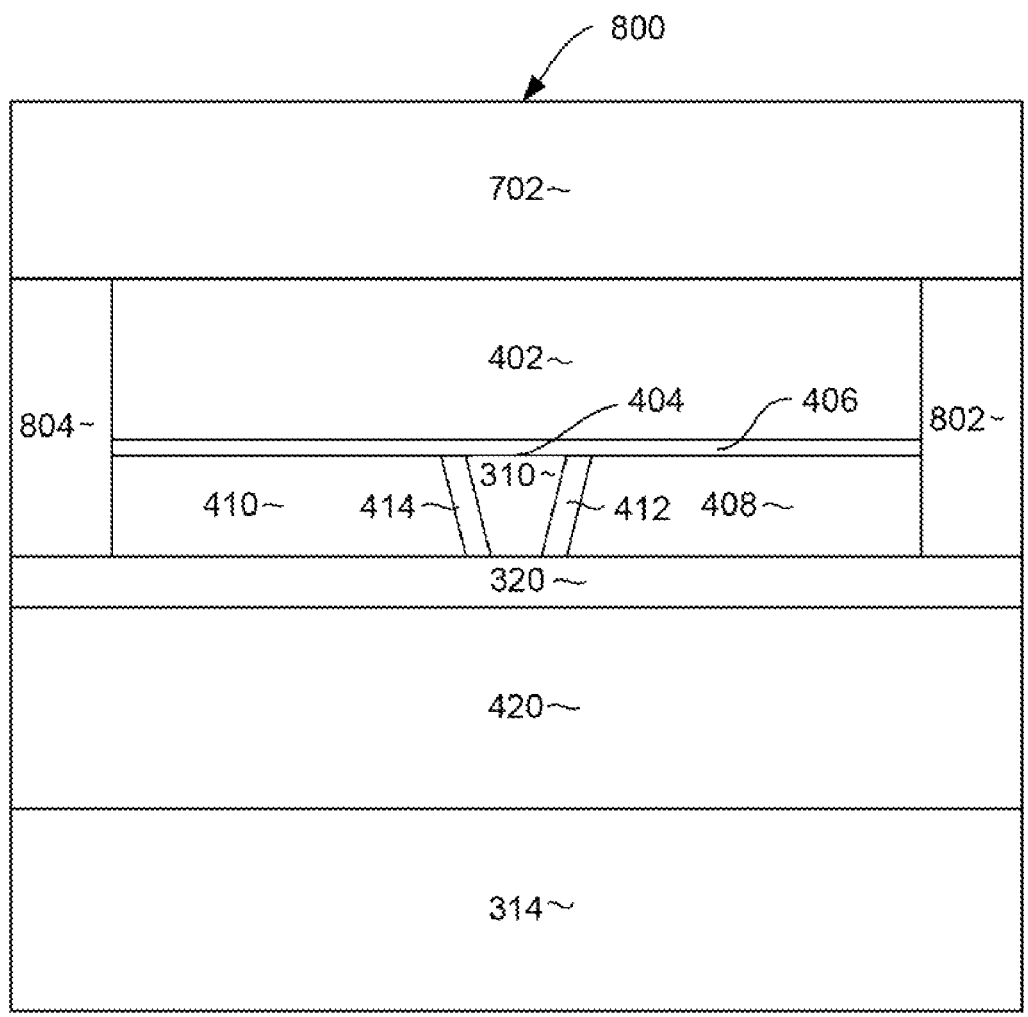
FIG. 8 is an ABS view of the write head of FIG. 7.

With reference now to FIG. 8, the trailing shield 402 and side shields 408, 410 and trailing shield 402 are magnetically connected with magnetic studs 802, 804. The studs 802, 804 are constructed of a magnetic material such as NiFe or some other material and are magnetically connected with the upper, or trailing return pole 702. In this way, the studs 802, 804 magnetically connect the shields 408, 410, 402 with the trailing return pole 702. As can be seen in FIG. 8, the studs 802, 804 can be separated from the return pole pedestal 420 by a non-magnetic layer 320. The studs can be disconnected from the pedestal 420 because the trailing return pole 702 provides a magnetic flux return path.

The throat height (STH) of the studs 802, 804 (as measured from the ABS to a back edge of each stud 802, 804) can be varied to further control the reluctance of the path from the side shields 408, 410 to the trailing return pole 702 as will be seen below. This allows further control of the amount of flux leakage difference between the write pole 310 to side shields 408, 410 as compared with that between the write pole 310 and trailing shield 402. Although the trailing shield 402 is shown being connected with the studs 802, 804, it could also be separated from the studs 802, 804, since the trailing shield 402 can be directly connected with the trailing return pole 702. Disconnecting the trailing shield 402 from the studs 802, 804 might be useful when a differently optimized flux leakage to the side shields 408, 410 as compared with the trailing shield 402 is desired.

Figure 9:
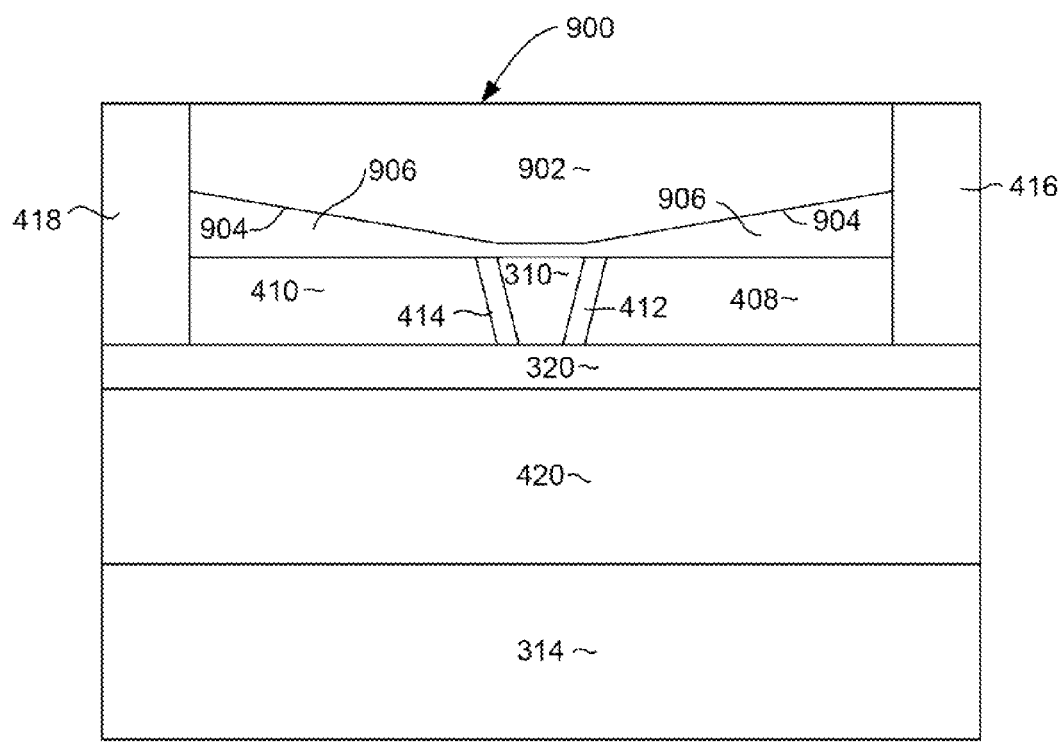
FIG. 9 is an ABS view of a write head according to another embodiment of the invention.

With reference now to FIG. 9, an ABS view of another embodiment of the invention, includes a trailing shield 902 having a tapered leading edge 904. Because the trailing shield 902 and side shields 408, 410 are independent structures that are separated by a non-magnetic gap layer 906, either the leading edge of the trailing shield 902 or trailing edge of the side shields 408, 410 can be tapered relative to the other, adjacent shield. For example, as shown in FIG. 9, the leading edge 904 of the trailing shield 902 can be configured to taper away from the side shields 408, 410 as it progresses laterally outward. In other words, as shown in FIG. 9, the leading edge 904 of the trailing shield 902 has a center portion adjacent to the write pole 310 that has a substantially uniform trailing gap distance from the write pole 310, and has first and second tapered outer portions that taper in the trailing direction as the progress laterally outward. This tapering of the shield can be included with any of the various embodiments for connecting the shields 408, 410, 902 to a leading return pole 314 or trailing return pole 702 (FIG. 7) or wherein one or both of the trailing shield 902 and or side shields 408, 410 are floating).

In addition, it would also be possible to construct the trailing return pole (shown in side cross section in FIG. 7) in a manner similar to that of the trailing shield 902. Although this taper is not shown, it would be similar in to the taper of the trailing shield 902 in that it could have a leading edge that tapers in the trailing direction with increased lateral distance.

Figure 10:
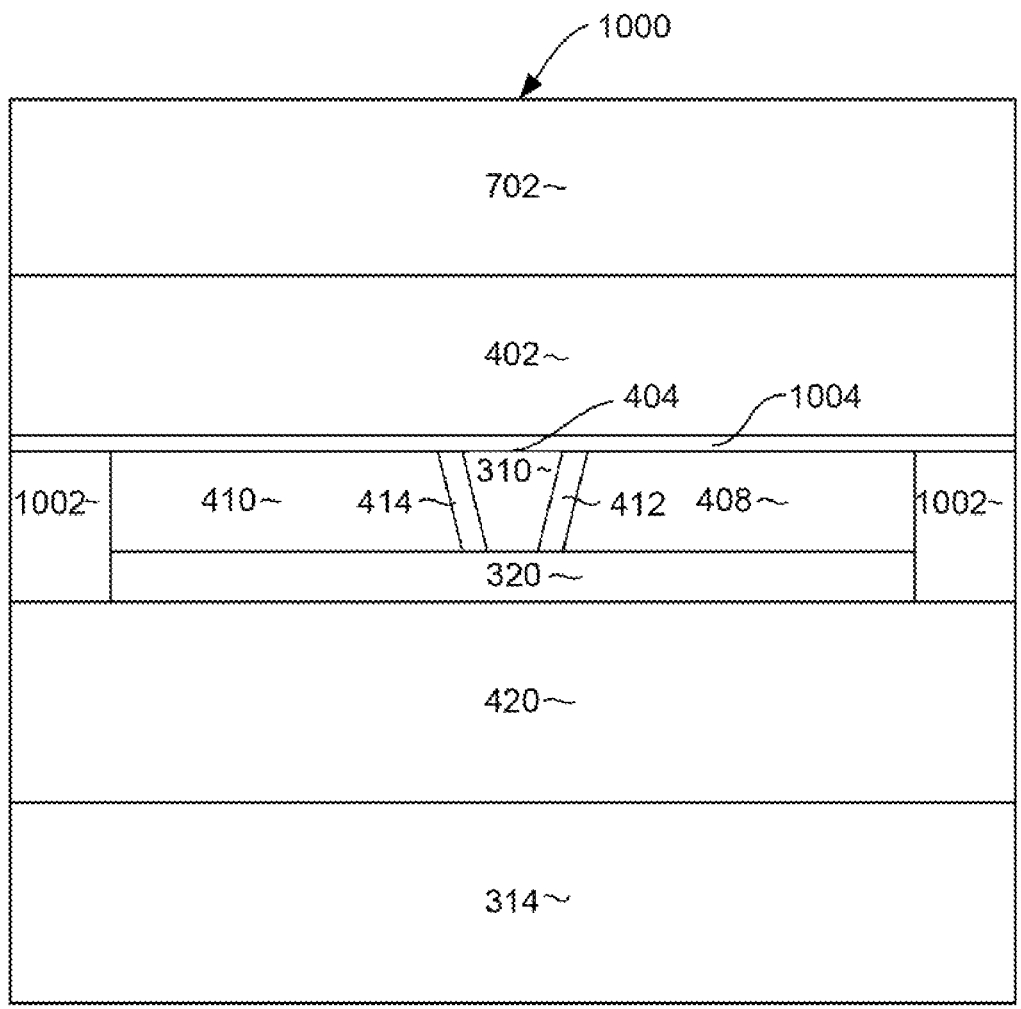
FIG. 10 is an ABS view of a write head according to still another embodiment of the invention.

With reference now to FIG. 10 in another embodiment of the invention, side shields 408, 410 are magnetically connected with the pedestal 420 and up-track return pole 314 via studs 1002. The trailing shield 402 is magnetically connected with the trailing return pole 702, having a structure such as is shown in the cross sectional view of FIG. 7. In this way, the amount of magnetic field traveling to the side shields 408, 410 and the amount of magnetic field traveling to the trailing shield 402 can be controlled by separate write coils. According to this embodiment, and with reference to FIG. 7, the amount of field traveling to the trailing shield can be controlled by the upper (or trailing) coil 704, whereas the amount of field traveling to the side shields 408, 410 (FIG. 10) can be controlled by the lower or leading write coil 317.

Another possible embodiment of the invention can be described with reference to FIG. 10 and FIG. 3. In this embodiment, the studs 1002 magnetically connect the side shields 408, 410 with the pedestal 420. The trailing shield 702, however, is not connected with the studs 1002 and is also not connected with a trailing return pole. The trailing shield 702 is, therefore, a floating trailing shield in that it is not magnetically connected with the other magnetic structures of the write head 1000.

Figure 11:
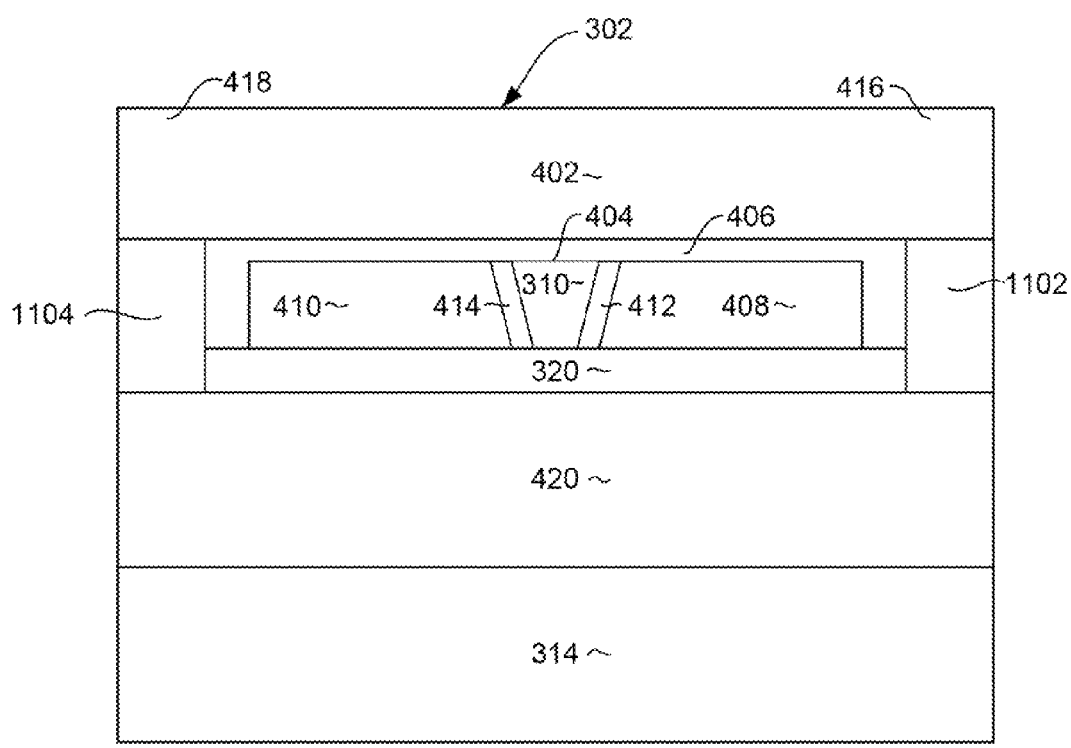
FIG. 11 is an ABS view of a write head according to yet another embodiment of the invention.

Another possible embodiment of the invention can be described with reference to FIGS. 11 and 3. In this embodiment, the trailing shield 402 is magnetically connected with magnetic studs 1102, 1104, which magnetically connect the trailing shield 402 with the pedestal 420 and leading return pole 314. The side shields 408, 410 are, however, magnetically separated from the studs 1102 by non-magnetic layers 406. In this case, the side shields 408, 410 are floating, while the trailing shield 402 is stitched to the leading return pole 314.

Figure 12:
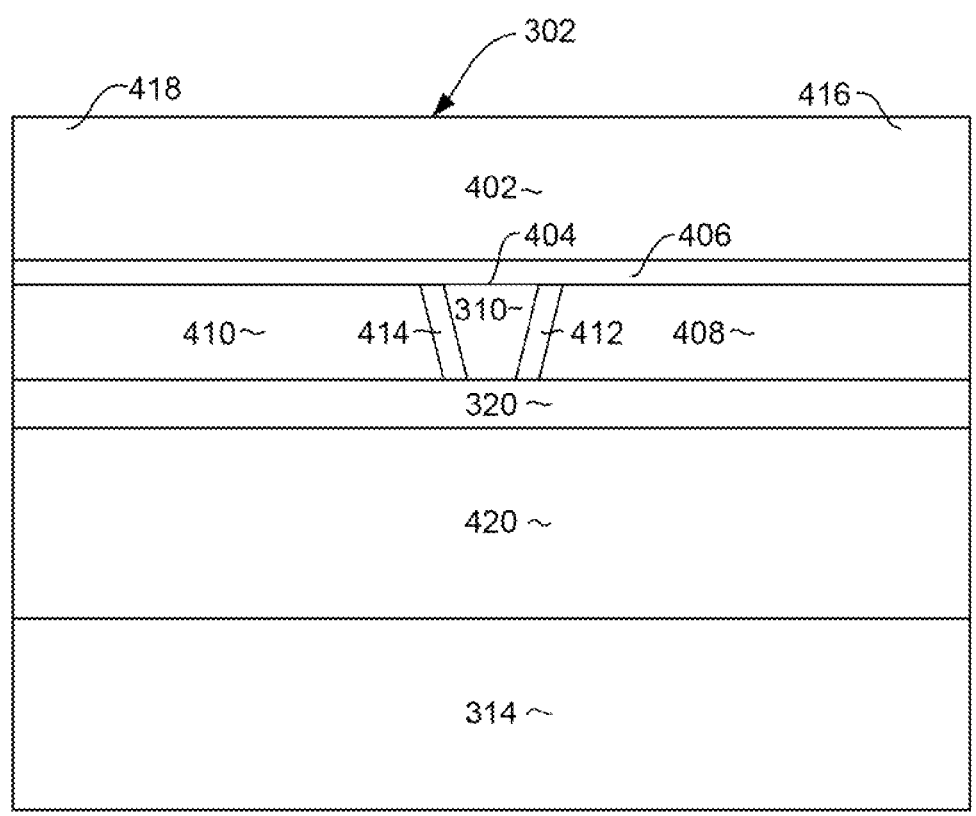
FIG. 12 is an ABS view of a write head according to another embodiment of the invention.

With reference now to FIGS. 12 and 3, in another embodiment of the invention, the side shields 408, 410 as well as the trailing shield 402 are all floating. In this embodiment, the side shields 408, 410 are not connected to other magnetic structures of the write head and neither is the trailing shield 402.

Alternatively, with reference to FIGS. 12 and 7, the side shield 408, 410 can be floating, while the trailing shield 402 is connected with the trailing return pole 702.

Figure 14:
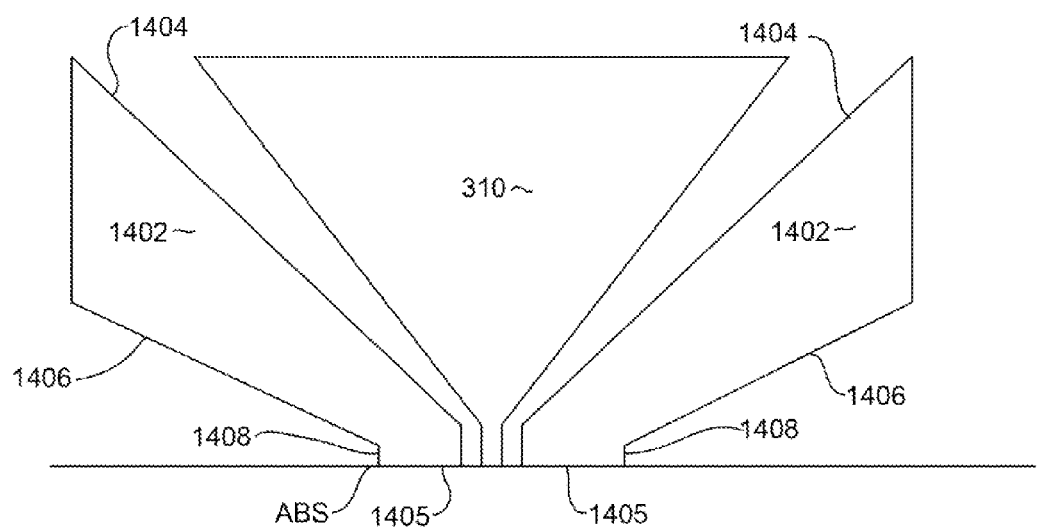
FIG. 14 is a top down, sectional view of a write head showing side shields according to another embodiment of the invention.
Figure 15:
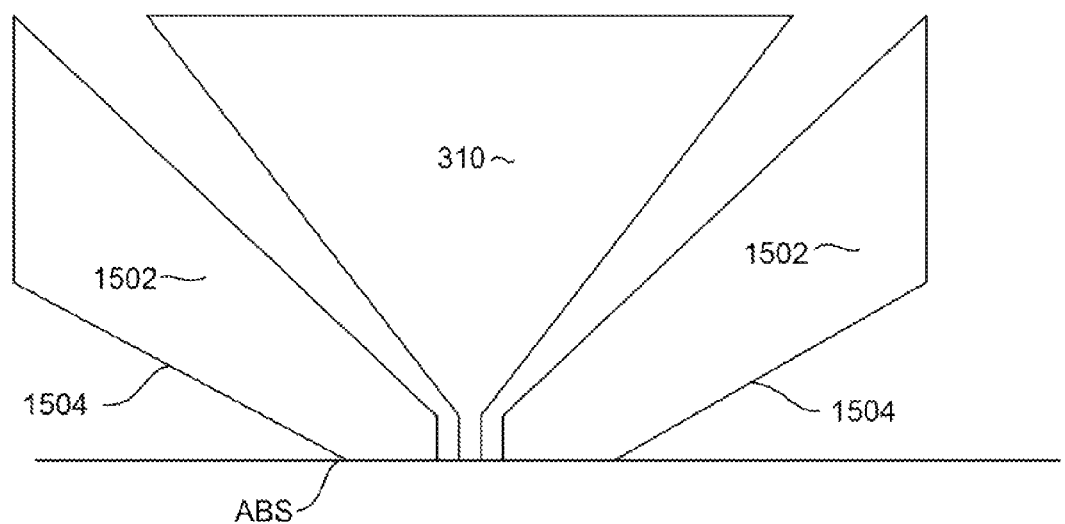
FIG. 15 is a top down, sectional view of a write head showing side shields according to still another embodiment of the invention.

With reference to FIG. 14, a write head can be configured with side shields 1402 that each have a back edge 1404 that tapers away from the ABS. In addition, the side shields 1402 can each be configured with a front edge 1406 that tapers away from the ABS. Each of the side shields 1402 can be configured with an inner portion 1405 that extends to the ABS and with a step 1408 that initiates the tapered portion of the front edge 1406. Alternatively, with reference to FIG. 15, the side shields 1502 can be configured each with a front edge 1504 that tapers away from the ABS, but configured without a step. In other words, the taper can initiate at the ABS.

The present invention provides a write head design such that the magnetostatic potentials can be independently adjusted between the write pole and the trailing shield and between the write pole and the side shields by having the shields be locally separate entities that can be designed independently. This is in contrast to standard wrap-around shields in which a difference in the magnetostatic potential drops from the pole to the side shields and from the pole to the trailing shields can only be adjusted by the difference in the side gap and trailing gap (because the side and trailing shield throat heights must be equal). An advantage of this new type of design is that one can independently tune the head field gradient down-track and the head field gradient cross-track. This results in designs that can have increased down-track gradients, (reducing media jitter, and thereby increasing linear density) and reduced write width and side erasure fields (controlling adjacent track erasure, increasing track density and consequently areal density). Moreover, one does not need to scale the pole width, pole thickness, or flare point, and thus this invention is a non-scaling solution to improve areal density. This design could also be exploited to tune a cross-track gradient that is equivalent or superior to the down-track gradient, which would be advantageous for future low bit-aspect ratio products, be they conventional perpendicular or perhaps patterned media recording systems.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for perpendicular magnetic recording, comprising:
    a magnetic write pole having a trailing edge, a leading edge and first and second laterally opposed sides;
    first and second magnetic side shields extending laterally from the first and second laterally opposed sides of the write pole, each of the first and second side shields being separated from the write pole by a non-magnetic side gap layer at least a portion of each of the first and second magnetic shields being located within a region bounded by planes defined by the trailing and leading edges;
    a trailing shield formed adjacent to the trailing edge of the write pole, the trailing shield being separated from the write pole and from the first and second side shields by a non-magnetic layer;
    wherein:
        at least one of the first and second magnetic side shields has a Side Shield Throat Height (SSTH) that varies with increasing distance from the write pole;
        the trailing shield has a Trailing Shield Throat Height (TSTH); and
        SSTH and TSTH are unequal at some point along the magnetic side shield.

2. A magnetic write head for perpendicular magnetic, recording, comprising:
    a magnetic write pole having a trailing edge, a leading edge and first and second laterally opposed sides;
    first and second magnetic side shields extending laterally from the first and second laterally opposed sides of the write pole, each of the first and second side shields being separated from the write pole by a non-magnetic side gap layer at least a portion of each of the first and second magnetic shields being located within a region bounded by planes defined by the trailing and leading, edges;
    a trailing shield formed adjacent to the trailing edge of the write pole, the trailing shield being separated from the write pole and from the first and second side shields by a non-magnetic layer;
    wherein:
        the write head has an air bearing surface (ABS);
        at least one of the magnetic side shields has a non-uniform throat height as measured from the ABS; and
        at least a portion of the trailing shield has a uniform throat height as measured from the ABS.

3. A magnetic write bead for perpendicular magnetic recording, comprising:
    a magnetic write pole having an end disposed at an air bearing surface, and having a trailing edge, a leading edge and first and second laterally opposed sides;
    a magnetic return pole having an end disposed at the air bearing surface;
    a magnetic pedestal, magnetically connected with the return pole at the end of the return pole and extending toward the write pole;
    first and second magnetic side shields formed adjacent to the first and second laterally opposed sides of the write pole, at least a portion of each of the first and second magnetic side shields being located within a region hounded by planes defined by the trailing, and leading edges of the write pole, each of the first and second side shields being separated from the write pole by a non-magnetic side gap layer;
    a magnetic trailing shield formed adjacent to the trailing edge of the write pole, the magnetic trailing shield being separated from the write pole and from the first and second magnetic side shields, by a non-magnetic layer;
    a first magnetic stud, magnetically connected with the trailing shield, the first magnetic side shield and the magnetic pedestal; and
    a second magnetic stud, magnetically connected with the trailing shield, the second magnetic side shield and the magnetic pedestal.

4. A magnetic write head as in claim 3, wherein:
    at least one of the first and second magnetic side shields has a Side Shield Throat Height (SSTH) that varies with increasing distance from the write pole;
    the trailing shield has a Trailing Shield Throat Height (TSTH); and
    SSTH and TSTH are unequal at some point along the magnetic side shield.

5. A magnetic write head as in claim 3, wherein:
    the write head has an air bearing surface (ABS);
    at least one of the magnetic side shields has a non-uniform throat height as measured from the ABS; and
    at least a portion of the trailing shield has a uniform throat height as measured from the ABS.

6. A magnetic write head as in claim 3, wherein:
    the write head has an air bearing surface (ABS);
    at least one of the magnetic side shields has an inner end and an outer end and has a throat height as measured from the ABS that varies from its inner end to its outer end; and
    the trailing shield has a throat height that is constant.

* * * * *